United States Patent Office 3,290,329
Patented Dec. 6, 1966

3,290,329
PURIFICATION OF PYRROLIDONE-(2)
Helmut Doerfel, Ludwigshafen (Rhine), Germany, assignor to Badische Anilin- & Soda-Fabrik Aktiengesellschaft, Ludwigshafen (Rhine), Germany
No Drawing. Filed Nov. 25, 1964, Ser. No. 413,985
Claims priority, application Germany, Nov. 30, 1963,
B 74,478
12 Claims. (Cl. 260—326.5)

This invention relates to a new process for purifying technical grade pyrrolidone-(2).

High molecular weight polypyrrolidone suitable for spinning may be prepared by prior art polymerization methods only from particularly pure pyrrolidone-(2) (hereinafter referred to briefly as pyrrolidone). Technical grade pyrrolidone (usually prepared by reaction of butyrolactone with ammonia) contains not only water, butyrolactone and derivatives of gamma-pyrrolidylbutyric acid, but also a number of unknown impurities, some of which are basic and/or unsaturated. The presence of these substances becomes evident, for example in alkaline reaction of technical grade pyrrolidone, in its instability to strong oxidizing agents, in yellowing during prolonged standing and above all in disturbance of the sensitive anionic polymerization. The impurities in technical grade pyrrolidone either completely suppress the polymerization reaction or lead to its premature cessation, so that products having greatly fluctuating and low molecular weight are obtained.

Several methods have already been recommended for the purification of pyrrolidone. For example in one prior art method, pyrrolidone is treated with carboxylic anhydrides and then distilled in the presence of a non-volatile base. Pyrrolidone purified in this way is, however, not pure enough to be converted with good yields into polypyrrolidone of adequately high molecular weight. According to another method, crude pyrrolidone containing water is cooled to 0° C., the pyrrolidone hydrate which crystallizes out is separated from the liquid constituents, the water of crystallization is removed by azeotropic distillation with benzene or toluene and the dehydrated pyrrolidone is distilled over in vacuo. A yield of 70% of pyrrolidone having a purity of 95 to 96% is obtained with reference to the crude pyrrolidone used. A product as impure as this may be used for the production of vinylpyrrolidone but is unsuitable for polymerization.

According to another prior art method, pyrrolidone is purified by distillation over phosphorus pentoxide, the yield being 86%. Technical grade pyrrolidone which has been prepared from butyrolactone by reaction with ammonia cannot be purified by this method, even by distilling it twice over phosphorus pentoxide, to an extent sufficient for polypyrrolidone having the desired high molecular weight to be prepared therefrom by anionic polymerization. Purification of pyrrolidone (which has been obtained from butyrolactone) by treatment with alkali metal hydroxides also yields a monomer which can only be converted into polypyrrolidone in low yields and inadequately high molecular weight. Furthermore it has already been recommended that commercial pyrrolidone which is intended for polymerization should be purified by repeated recrystallization from toluene or xylene. In the four-stage crystallisation process described, however, there is considerable waste of substance, quite apart from the considerable expenditure for a four-stage crystallization. If technical grade pyrrolidone which has been prepared from butyrolactone be crystallized only once from toluene, the product purified in this way can only be converted into a polypyrrolidone having relatively low molecular weight.

It is an object of the present invention to provide a new process for purifying technical grade pyrrolidone, particularly for pyrrolidone which has been obtained by reaction of butyrolactone with ammonia. It is another object of this invention to provide a purification process according to which technical grade pyrrolidone can be purified economically and efficiently. It is a further object of the invention to provide a process according to which pyrrolidone suitable for polymerization can be obtained easily from technical grade pyrrolidone. These and other objects and advantages will be better understood from the following detailed description and examples.

I have found that technical grade pyrrolidone can be purified in a simple way and in good yields and converted into a product suitable for polymerization by recrystallizing it at temperatures of from −70° to +20° C. from an aliphatic alcohol, ketone or mixture of these substances which has a lower boiling point than pyrrolidone.

By using the said oxygen-containing solvents, a very pure product outstandingly suitable for the production of high grade polyamide is obtained from technical grade pyrrolidone which has been prepared from butyrolactone and ammonia. In contrast with prior art crystallization methods, the new process is distinguished by the fact that a purer product is obtained for a comparable crystallization expenditure. Moreover, the other prior art purification methods, in spite of the fact that in some cases they involve a considerably higher expenditure, give a less pure pyrrolidone than the process according to the invention.

The initial material used is a technical grade pyrrolidone which has been prepared from butyrolactone and ammonia by conventional methods and which contains for example small amounts, for example 0.2 to 0.4% by weight of impurities, for example 0.02% by weight of butyrolactone, 0.07% by weight of water, derivatives of gamma-pyrrolidylbutyric acid, such as gamma-pyrrolidylbutyramide, and also a few other impurities, some of which have not been identified. The volatile bases contained in 20 g. of the initial material usually require 2.5 to 4 ml. of 0.1 N acid for neutralization. The freezing point of technical grade pyrrolidone is usually about 24° C.

The solvents used are preferably those having a boiling point at least 50° C. lower than that of pyrrolidone to ensure that the pyrrolidone may be separated without difficulty. Particularly suitable alcohols are alkanols having up to six carbon atoms, such as methanol, ethanol, isopropanol, butanol and isobutanol. Ketones which are particularly preferred are open-chain alkanones having three to seven carbon atoms, such as acetone, methyl ethyl ketone and diisopropyl ketone. The solvent is generally used in amounts of from 1 to 50% by weight, advantageously 5 to 25% by weight, with reference to the technical grade pyrrolidone. The most favorable amount of a given solvent or solvent mixture may easily be determined by a preliminary test.

Purification of the pyrrolidone may be carried out for example by dissolving the technical grade pyrrolidone in the solvent at a temperature of from 25 to 30° C., separating any solid impurities, cooling the solution while stirring to a temperature at least 5° to 10° C. below the dissolution temperature, but to at least +20° C. and not below −70° C., preferably to a temperature in the range of −30° to +15° C. and separating the deposited crystals from the mother liquor by filtration or centrifuging. A single recrystallization is sufficient to purify technical grade pyrrolidone. Often it is not necessary to wash the crystals but this may be advantageous when using very readily volatile solvents or effecting recrystallization from a very small amount of solvent. Recrystallization at temperatures higher than 0° C. is particularly simple because ice cooling can be used and even when working without exclusion of atmospheric humidity, only very small amounts of water are deposited on the crystallized product. The solvent can be separated from the solvent-wet crystals by a simple distillation, preferably at subatmospheric pressure. The solvent may thereafter be used without purification for recrystallization of pyrrolidone. The solvent-wet pyrrolidone crystals may however be used for the polymerization without removal of the solvent provided that in the preparation of the catalyst used for the polymerization, pyrrolidone is used and moreover the solvent and traces of water are separated by distillation. This distillation also removes the solvent remaining in the recrystallized pyrrolidone.

The solvent contained in the mother liquor from the crystallization may be recovered most simply by distillation and used again for recrystallization without purification. The pyrrolidone obtained as distillation residue is enriched with impurities and may be converted into a product which has about the degree of purity of technical grade pyrrolidone by fractional distillation over a column, if desired after treatment for 1 to 5 hours with an oxidizing agent, for example 0.3 to 3% by weight, with reference to pyrrolidone, of an alkali metal chromate or potassium permanganate, the oxidizing agent being allowed to remain in the bottoms during distillation. After it has been purified by recrystallization by the process according to this invention, it may be converted by anionic polymerization into high grade polypyrrolidone. It is advantageous however to use for the polymerisation a mixture of recrystallized technical pyrrolidone and a product that has been recovered from the mother liquor of the crystallization and recrystallized. Thus for example when using a mixture of 9 parts of directly recrystallized pyrrolidone and 1 part of a pyrrolidone recovered from the mother liquor and recrystallized, a high molecular weight polymer is obtained which is equivalent to a product obtained by polymerization of directly recrystallized technical grade pyrrolidone alone.

The process according to this invention is further illustrated by the following examples. The parts specified are parts by weight. The purifying effect of recrystallization is determined in each case by polymerization and viscosity measurements on the polymer.

*Example 1*

A mixture of 300 parts of technical grade pyrrolidone having a solidification point of 24.2° C. and 33 parts of ethanol is cooled while stirring to 0° C., left at this temperature for some minutes and then suction filtered. 272 parts of crystals moist with ethanol and 54 parts of mother liquor are obtained. 27 parts of ethanol is distilled off from the crystals under subatmospheric pressure and this may be used again without further purification for recrystallization of pyrrolidone. 245 parts of purified pyrrolidone remains, equivalent to a yield of 81.8% with reference to the technical grade pyrrolidone used for the recrystallization.

100 parts of the pyrrolidone thus purified has 1.5 parts of sodium methylate added to it. 23.0 parts of pyrrolidone is distilled off at a pressure of 1 mm. Hg in order to remove completely the methanol, traces of water and any small amount of ethanol, the distillation residue is cooled and 200 parts of cyclohexane dried over sodium and 1.5 parts of adipoyldipyrrolidone are added at room temperature under nitrogen and while excluding moisture. The mixture is stirred for twenty-four hours at 20° to 25° C. while excluding air and moisture,. The polypyrrolidone is then suction filtered from the cyclohexane and boiled up twice with methanol under reflux. 70.0 parts of polypyrrolidone is obtained, equivalent to a yield of 91.0% with reference to the pyrrolidone used for the polymerization. The 23.0 parts of pyrrolidone distilled off prior to the addition of cyclohexane and activator is freed from traces of methanol, water and solvent by fractional distillation at 1 mm. Hg and may be polymerized to polypyrrolidone having the same properties as the polymer prepared from the bulk of the pyrrolidone.

A sample of the polypyrrolidone is dissolved at room temperature in formic acid, precipitated by pouring the solution into water, suction filtered, washed free from acid with water and washed with acetone until substantially anhydrous. When the dried product is dissolved in 96% sulfuric acid (0.1 g. in 100 ml.), it has a relative viscosity of 1.47, equivalent to an inherent viscosity of 3.85 and a K-value of 149. A solution (0.2 g. in 100 ml.) in m-cresol has a relative viscosity of 2.01, equivalent to an inherent viscosity of 3.49 and a K-value of 144. The softening point is 260° to 265° C. The polymer loses only 3.5% of its weight by depolymerization when it is heated for one hour in a stream of nitrogen at 220° C.

*Example 2*

Ethanol is removed by distillation at subatmospheric pressure from a mother liquor (54 parts) obtained according to Example 1. 50 parts of pyrrolidone having a higher concentration of impurities remains behind; 0.5 part of sodium bichromate is added thereto and the mixture heated for three hours at 100° C. The pyrrolidone is then fractionally distilled off at a pressure of 1 mm. Hg over a Raschig column, 8.8 parts of first runnings, 36.7 parts of main fraction and 6 parts of last runnings thus being obtained.

1.5 parts of n-butanol is added to 15 parts of the main fraction which is then cooled to +7° C. until the bulk of the pyrrolidone has crystallized, and suction filtered. 13.2 parts of pyrrolidone crystals is obtained and is polymerized as described in Example 1. Polypyrrolidone having a K-value of 113 (0.1 g. dissolved in 100 ml. of 96% sulfuric acid) is obtained in a yield of 90%.

A mixture of the first runnings, last runnings and 11 parts of the main fraction is recrystallized from n-butanol as described above. 22 parts of pyrrolidone is obtained (yield 85.4%). A mixture of 10 parts of these crystals and 90 parts of a product obtained by direct recrystallization of technical grade pyrrolidone from ethanol as described in Example 1 is polymerized as described in Example 1. Polypyrrolidone having a K-value of 137 (0.1 g. dissolved in 100 ml. of 96% sulfuric acid) is obtained in a yield of 76%.

*Example 3*

Recrystallization of pyrrolidone is carried out as described in Example 1 and ethanol is removed from 51 parts of the mother liquor by distillation at subatmospheric pressure. The residue of 45 parts of contaminated pyrrolidone is distilled over a Raschig column at 1 mm. Hg without any addition. After 4.3 parts of first runnings has passed over, 35 parts of main fraction and 3 parts of last runnings are collected. 15 parts of the main fraction is recrystallized from 1.5 parts of n-butanol at +7° C. 12.2 parts of purified pyrrolidone is obtained. The total yield (with reference to the pyrrolidone from the mother liquor) is 62.3%. 10 parts of the pyrrolidone thus obtained is mixed with 90 parts of pyrrolidone which has been obtained by direct recrystallization of technical grade product by the method of Example 1. When this mixture is polymerized as described in Example 1 a yield of 76% of polypyrrolidone having a K-value of 138 (0.1 g. dissolved in 100 ml. of 96% sulfuric acid) is obtained.

Examples 4 to 8

The following table gives the conditions and results of purifying technical grade pyrrolidone by recrystallization from other solvents. The yields of polypyrrolidone specified relate to a polymerization period of twenty-four hours, as used in Example 1. By doubling the polymerization period, the yield of polypyrrolidone can be increased under otherwise the same conditions to 92 to 97%. The molecular weight of the polymer is not increased beyond the value for a polymerization period of twenty-four hours.

In Examples 4 to 10, the following solvents are used: 4-methanol, 5-n-butanol, 6-isobutanol, 7-methyl ethyl ketone, 8-acetone. The solvents used in the viscosity tests are (a) 96% sulfuric acid; (b) m-cresol and (c) 99% formic acid.

The table is divided into two parts, the first part giving details of the purification of the technical grade pyrrolidone. In the first part of the table, the columns have the following significance:

No.=the number of the example; P=the amount in parts by weight of technical grade pyrrolidone used; S=the amount of solvent used; T=the crystallization temperature used in ° C.; C=the amount of pyrrolidone crystals obtained in parts by weight and as a percentage; M=the amount of pyrrolidone obtained from the mother liquor in parts by weight; Y=the total yield of pyrrolidone in parts by weight and as a percentage. In the second part of the table, the first column repeats the number of the examples; the following five columns are concerned with viscosity measurements on polypyrrolidone prepared by the method described in Example 1; S=the solvent used; Conc.=the concentration in g. in 100 ml.; rel.=relative viscosity ($\eta_{rel.}$); inh.=inherent viscosity ($\eta_{inh.}$); K=K-value. The final column (Y) gives the yield of pyrrolidone in percent.

TABLE.—PART 1

| No. | P | S | T, ° | C | M | Y |
|---|---|---|---|---|---|---|
| 4 | 300 | 33.3 | −12 | 252 84.0% | 26.4 | 278.4 92.9% |
| 5 | 300 | 33.3 | +4 | 258 86.2% | 21.4 | 279.4 93.1% |
| 6 | 300 | 33.3 | +9 | 244 81.3% | 29.0 | 273 91% |
| 7 | 300 | 33.3 | +7 | 240 80.0% | 32.0 | 272 90.7% |
| 8 | 150 | 50 | −10 | 124 82.7% | 14.0 | 138 92.0% |

TABLE.—PART 2

| No. | S | Conc. | Rel. | Inh. | K | Y, percent |
|---|---|---|---|---|---|---|
| 4 | (a) | 0.1 | 1.44 | 3.65 | 144 | 84.5 |
|   | (b) | 0.2 | 1.87 | 3.13 | 136 |  |
|   | (c) | 0.1 | 2.86 | 10.5 | 258 |  |
| 5 | (a) | 0.1 | 1.39 | 3.29 | 136 | 90 |
|   | (b) | 0.2 | 1.86 | 3.10 | 135 |  |
|   | (b) | 1.0 | 7.82 | 2.05 | 110 |  |
|   | (c) | 0.1 | 2.50 | 9.16 | 241 |  |
| 6 | (a) | 0.1 | 1.32 | 2.78 | 124 | 78.5 |
|   | (b) | 0.2 | 1.61 | 2.38 | 117 |  |
|   | (c) | 0.1 | 2.23 | 8.01 | 224 |  |
| 7 | (a) | 0.1 | 1.38 | 3.22 | 125 | 79 |
|   | (b) | 0.2 | 1.63 | 2.45 | 118 |  |
|   | (c) | 0.1 | 2.38 | 8.7 | 234 |  |
| 8 | (a) | 0.1 | 1.31 | 2.70 | 122 | 78 |
|   | (b) | 0.1 | 1.33 | 2.85 | 125 |  |
|   | (c) | 0.1 | 1.74 | 5.55 | 250 |  |

I claim:
1. A process for purifying technical grade pyrrolidone intended for polymerization which comprises recrystallizing the pyrrolidone at from −70° to +20° C. from a member selected from the group consisting of an alkanol having one to six carbon atoms, an alkanone having three to seven carbon atoms and mixtures thereof.
2. A process as claimed in claim 1 wherein the solvent used is methanol.
3. A process as claimed in claim 1 wherein the solvent used is ethanol.
4. A process as claimed in claim 1 wherein the solvent used is isopropanol.
5. A process as claimed in claim 1 wherein the solvent used is butanol.
6. A process as claimed in claim 1 wherein the solvent used is isobutanol.
7. A process as claimed in claim 1 wherein the solvent used is acetone.
8. A process as claimed in claim 1 wherein the solvent used is methyl ethyl ketone.
9. A process as claimed in claim 1 wherein the solvent is used in an amount of from 1 to 50% by weight with reference to the technical grade pyrrolidone.
10. A process as claimed in claim 9 wherein said percentage is from 5 to 25% by weight.
11. A process as claimed in claim 1 wherein the technical grade pyrrolidone is dissolved in the solvent at a temperature of from 25° to 30° C., any solid impurities are separated, and the solution is cooled, while stirring, to a temperature at least 5° to 10° C. below the dissolving temperature.
12. A process as claimed in claim 1 wherein recrystallization is carried out at a temperature of from −30° to +15° C.

References Cited by the Examiner
UNITED STATES PATENTS
2,802,777  8/1957  Lohr _____ 260—326.5

ALEX MAZEL, *Primary Examiner.*

HENRY R. JILES, *Examiner.*

JOSE TOVAR, *Assistant Examiner.*